(12) United States Patent
Kanehara et al.

(10) Patent No.: US 9,046,174 B2
(45) Date of Patent: Jun. 2, 2015

(54) COEFFICIENT OF FRICTION CORRECTION DEVICE FOR BELT-TYPE CONTINUOUSLY VARIABLE TRANSMISSION

(71) Applicant: HONDA MOTOR CO., LTD., Tokyo (JP)

(72) Inventors: Shigeru Kanehara, Wako (JP); Atsushi Fujikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/391,370

(22) PCT Filed: Jan. 25, 2013

(86) PCT No.: PCT/JP2013/051555
§ 371 (c)(1),
(2) Date: Oct. 8, 2014

(87) PCT Pub. No.: WO2013/161335
PCT Pub. Date: Oct. 31, 2013

(65) Prior Publication Data
US 2015/0088388 A1    Mar. 26, 2015

(30) Foreign Application Priority Data

Apr. 26, 2012   (JP) ................................. 2012-100582

(51) Int. Cl.
*F16H 61/662*    (2006.01)
*F16H 61/66*     (2006.01)

(52) U.S. Cl.
CPC .. *F16H 61/66272* (2013.01); *F16H 2061/6604* (2013.01)

(58) Field of Classification Search
CPC ............. F16H 7/02; F16H 9/04; F16H 59/68; F16H 2061/0087; F16H 61/662; F16H 61/66218
USPC .......................................... 701/51, 55, 58, 60
See application file for complete search history.

(56) References Cited

U.S. PATENT DOCUMENTS 4,619,629 A * 10/1986 Shigematsu et al. ............ 474/28
5,427,579 A *  6/1995 Kanehara et al. ............... 474/28
(Continued)

FOREIGN PATENT DOCUMENTS

JP    8-312772 A    11/1996
JP    2001-12595 A   1/2001
(Continued)

OTHER PUBLICATIONS

International Search Report dated Feb. 26, 2013 issued in corresponding application No. PCT/JP2013/051555.

*Primary Examiner* — Edwin A Young
(74) *Attorney, Agent, or Firm* — Westerman, Hattori, Daniels & Adrain, LLP

(57) ABSTRACT

A coefficient of friction correction device for a belt-type continuously variable transmission is provided in which the coefficient of friction corrector calculates a coefficient of friction correction factor from the coefficient of friction calculated by the coefficient of friction calculator for a predetermined gear ratio and the default value of the coefficient of friction stored in the coefficient of friction map for the predetermined gear ratio, and uniformly corrects the default value of the coefficient of friction stored in the coefficient of friction map for each gear ratio using the coefficient of friction correction factor. This enables the default values of the coefficient of friction of all the coefficient of friction maps to be corrected by calculating just one coefficient of friction correction factor, and enables the reliability of the corrected default value of the coefficient of friction to be ensured.

2 Claims, 11 Drawing Sheets

(56) References Cited

U.S. PATENT DOCUMENTS 6,383,114 B1* 5/2002 Hoshiya et al. .................. 477/2
2004/0067808 A1* 4/2004 Kanehara et al. ............. 474/242
2004/0242370 A1 12/2004 Iwatsuki et al.
2005/0090962 A1* 4/2005 Ota et al. ........................ 701/51

FOREIGN PATENT DOCUMENTS

| JP | 2005-265069 A | 9/2005 |
| JP | 2007-85396 A | 4/2007 |
| JP | 4158665 B2 | 10/2008 |

* cited by examiner

COEFFICIENT OF FRICTION CORRECTION DEVICE FOR BELT-TYPE CONTINUOUSLY VARIABLE TRANSMISSION

TECHNICAL FIELD

The present invention relates to a coefficient of friction correction device for a belt-type continuously variable transmission, the device including a coefficient of friction map storing a default value of a coefficient of friction between a pulley and an endless belt for each gear ratio, coefficient of friction calculation means for calculating a coefficient of friction between the pulley and the endless belt, and coefficient of friction correction means for correcting the default value of the coefficient of friction stored in the coefficient of friction map based on the coefficient of friction calculated by the coefficient of friction calculation means.

BACKGROUND ART

In a belt-type continuously variable transmission in which an endless belt is wound around a drive pulley provided on an input shaft and a driven pulley provided on an output shaft, the groove width of the pulley is changed by controlling the axial thrust with which the pulley compresses the endless belt, thus increasing/decreasing the gear ratio and preventing the occurrence of slip between the pulley and the endless belt. When the axial thrust of the pulley is controlled so as to prevent the occurrence of slip between the pulley and the endless belt, if the coefficient of friction between the pulley and the endless belt is large, it is difficult for slip to occur, but the amount of heat generated increases to thus possibly degrade efficiency, whereas if it is small, slip easily occurs, and it is therefore necessary to calculate a necessary axial thrust while taking into consideration the coefficient of friction.

Since the coefficient of friction between the pulley and the endless belt changes according to the gear ratio of the belt-type continuously variable transmission, a coefficient of friction map in which a default value (initial value set for a brand new car) of the coefficient of friction is prestored is provided for each gear ratio, and the axial thrust of the pulley is controlled by reading out the default value of the coefficient of friction from the coefficient of friction map according to a given gear ratio. However, when the properties of the contact faces of the pulley and the endless belt change due to wear, etc. caused by change over time, the coefficient of friction therebetween gradually changes, the actual coefficient of friction deviates from the default value of the coefficient of friction stored in the coefficient of friction map, and it is therefore necessary to correct the default value of the coefficient of friction based on the actual coefficient of friction calculated from running conditions of the belt-type continuously variable transmission and use it for control of the axial thrust of the pulley.

Patent Document 1 below describes an arrangement in which the actual coefficient of friction between the pulley and the endless belt is calculated for each gear ratio, the default value of the coefficient of friction stored in the coefficient of friction map for the corresponding gear ratio is corrected using the calculated coefficient of friction, and the axial thrust of the pulley is controlled using the corrected coefficient of friction.

RELATED ART DOCUMENTS

Patent Documents

Patent Document 1: Japanese Patent No. 4158665

SUMMARY OF THE INVENTION

Problems to be Solved by the Invention

However, in order to calculate the actual coefficient of friction for each gear ratio, it is necessary for the belt-type continuously variable transmission to run in a steady state at the gear ratio for a predetermined time, but since for example a high gear ratio state when starting continues only for a very short period of time, it can be said that there is almost no opportunity to calculate the actual coefficient of friction in the high gear ratio state. Therefore, in the arrangement above, it is difficult to appropriately correct the default value of the coefficient of friction stored in the coefficient of friction map with respect to the entire gear ratio region, and there is a possibility that the lateral pressure of the pulley will become excessive to thus degrade the engine fuel consumption, or the lateral pressure of the pulley will become insufficient to thus cause the endless belt to slip.

The present invention has been accomplished in light of the above circumstances, and it is an object thereof to easily and appropriately correct, according to the occurrence of change over time in a pulley or an endless belt of a belt-type continuously variable transmission, the default value of the coefficient of friction between the pulley and the endless belt prestored in a coefficient of friction map for each gear ratio.

Means for Solving the Problems

In order to attain the above object, according to an aspect of the present invention, there is provided a coefficient of friction correction device for a belt-type continuously variable transmission, comprising a coefficient of friction map storing a default value of a coefficient of friction between a pulley and an endless belt for each gear ratio, coefficient of friction calculation means for calculating a coefficient of friction between the pulley and the endless belt, and coefficient of friction correction means for correcting the default value of the coefficient of friction stored in the coefficient of friction map based on the coefficient of friction calculated by the coefficient of friction calculation means, wherein the coefficient of friction correction means calculates a coefficient of friction correction factor from the coefficient of friction calculated by the coefficient of friction calculation means for a predetermined gear ratio and the default value of the coefficient of friction stored in the coefficient of friction map for the predetermined gear ratio, and uniformly corrects the default value of the coefficient of friction stored in the coefficient of friction map for each gear ratio using the coefficient of friction correction factor.

A drive pulley 13 and a driven pulley 14 of an embodiment correspond to the pulley of the present invention.

Effects of the Invention

In accordance with an aspect of the present invention, the coefficient of friction correction means calculates the coefficient of friction correction factor from the coefficient of friction calculated by the coefficient of friction calculation means for a predetermined gear ratio and the default value of the coefficient of friction stored in the coefficient of friction map for the predetermined gear ratio, and corrects the default value of the coefficient of friction stored in the coefficient of friction map for each gear ratio using the same coefficient of friction correction factor. Since this enables the default values of the coefficient of friction of all the coefficient of friction maps to be corrected by calculating just one coefficient of friction correction factor, and enables the reliability of the corrected default value of the coefficient of friction to be ensured, the computation load can be reduced compared with a conventional method in which a plurality of coefficient of friction correction factors are determined from a plurality of coefficients of friction calculated for each gear ratio, and the default value for the coefficient of friction stored in a coefficient of friction map for each gear ratio is corrected using the coefficient of friction correction factor. Moreover, compared with a conventional method in which the coefficient of friction is calculated for each of a plurality of gear ratios, the coefficient of friction may be calculated for just one gear ratio, thus making it possible to further enhance the reliability of the corrected default value of the coefficient of friction by increasing the frequency with which the coefficient of friction can be calculated.

EXPLANATION OF REFERENCE NUMERALS AND SYMBOLS

13 Drive pulley (pulley)
14 Driven pulley (pulley)
15 Endless belt
16 Coefficient of friction map
M3 Coefficient of friction calculation means
M4 Coefficient of friction correction means
$\mu$ Coefficient of friction
$\mu_0$ Default value of coefficient of friction
k Coefficient of friction correction factor

MODE FOR CARRYING OUT THE INVENTION

A mode for carrying out the present invention is explained below by reference to FIG. 1 to FIG. 11.

First Embodiment

Figure 1:
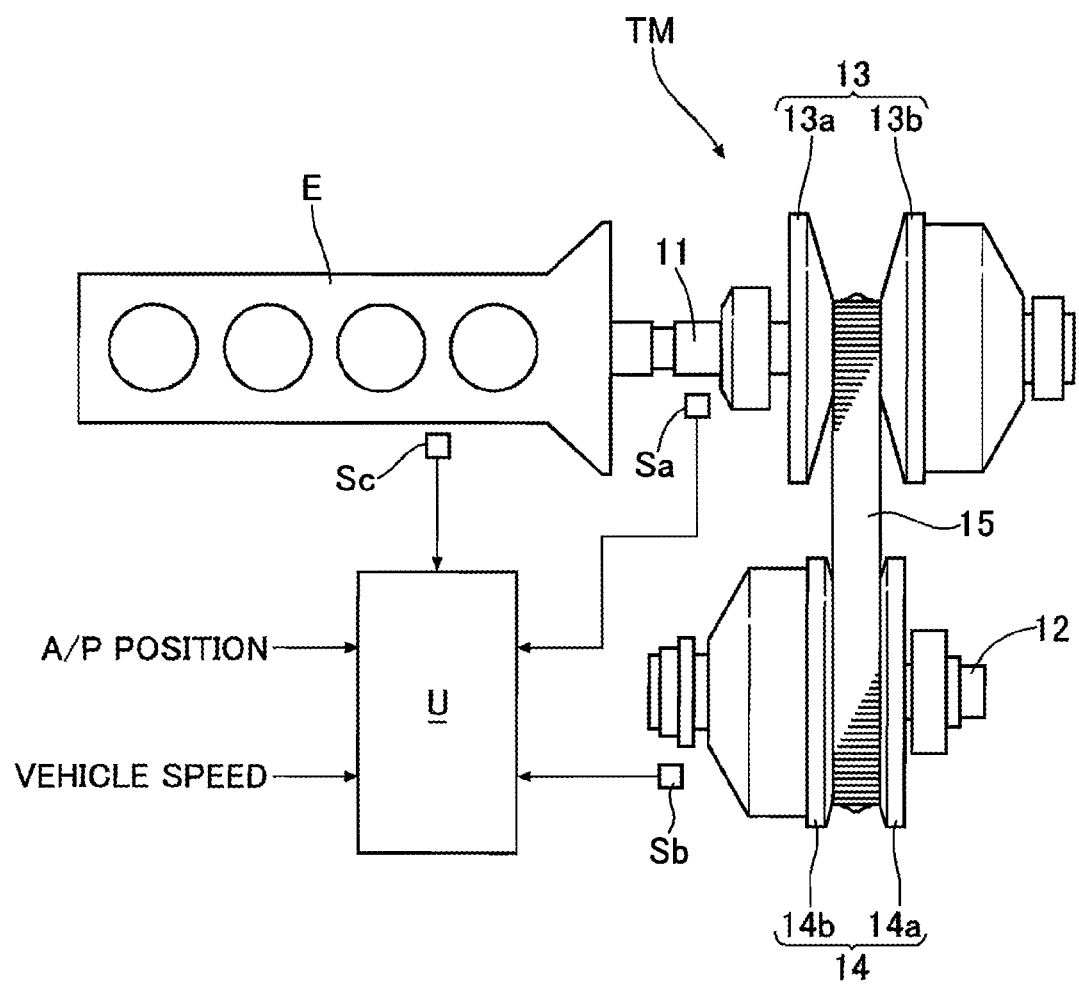
FIG. 1 is a diagram showing the overall structure of a belt-type continuously variable transmission. (first embodiment)

As shown in FIG. 1, a belt-type continuously variable transmission TM mounted on an automobile includes an input shaft 11 connected to an engine E, an output shaft 12 disposed in parallel to the input shaft 11, a drive pulley 13 provided on the input shaft 11, a driven pulley 14 provided on the output shaft 12, and an endless belt 15 made of metal wound around the drive pulley 13 and the driven pulley 14. The drive pulley 13 is formed from a fixed pulley half 13a and a movable pulley half 13b, the movable pulley half 13b being urged in a direction in which it moves closer to the fixed pulley half 13a by virtue of pulley lateral pressure. Similarly, the driven pulley 14 is formed from a fixed pulley half 14a and a movable pulley half 14b, the movable pulley half 14b being urged in a direction in which it moves closer to the fixed pulley half 14a by virtue of pulley lateral pressure. Therefore, the gear ratio of the belt-type continuously variable transmission TM can be freely changed by controlling the pulley lateral pressure acting on the movable pulley half 13b of the drive pulley 13 and the movable pulley half 14b of the driven pulley 14 so as to increase the groove width of one of the drive pulley 13 and the driven pulley 14 and decrease the groove width of the other.

Inputted into an electronic control unit U for controlling the gear ratio of the belt-type continuously variable transmission TM are a rotational speed of the input shaft 11 detected by an input shaft rotational speed sensor Sa, a rotational speed of the output shaft 12 detected by an output shaft rotational speed sensor Sb, and a rotational speed of the engine E detected by an engine rotational speed sensor Sc, together with an accelerator position signal, a vehicle speed signal, etc. The electronic control unit U carries out normal gear ratio control in which the pulley lateral pressure of the belt-type continuously variable transmission TM is changed based on the accelerator position signal and the vehicle speed signal as well as control in which a torque ratio Tr, which is described later, is estimated, and the pulley lateral pressure is changed using this torque ratio Tr in order to enhance the power transmission efficiency of the belt-type continuously variable transmission TM.

Figure 2:
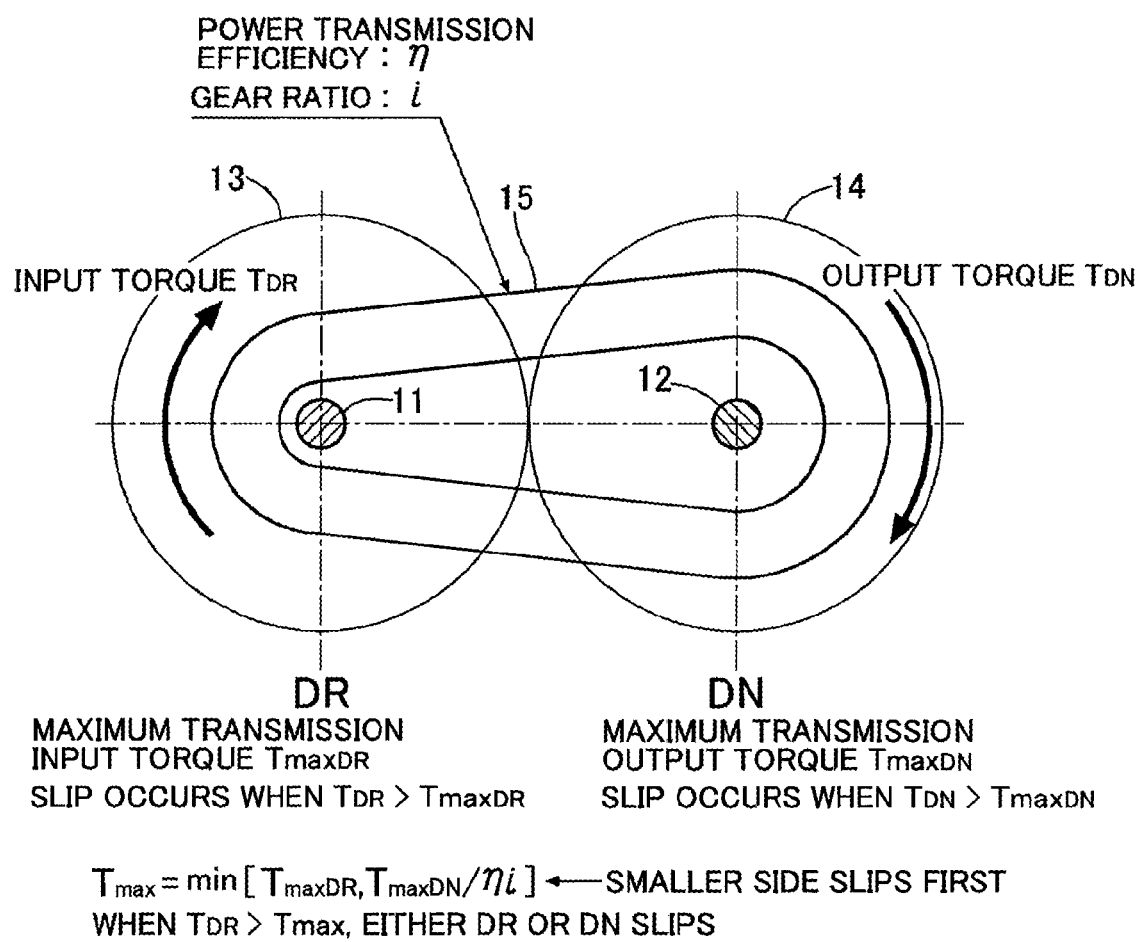
FIG. 2 is a diagram for explaining shift control and lateral pressure control of the belt-type continuously variable transmission. (first embodiment)

As shown in FIG. 2, when the input torque of the belt-type continuously variable transmission TM is $T_{DR}$, the output torque is $T_{DN}$, the maximum transmission input torque, that is, the input torque $T_{DR}$ at the instant when slip occurs between the drive pulley 13 and the endless belt 15 is $Tmax_{DR}$, the maximum transmission output torque, that is, the output torque $T_{DN}$ at the instant when slip occurs between the driven pulley 14 and the endless belt 15 is $Tmax_{DN}$, the power transmission efficiency is $\eta$, and the gear ratio is i, the maximum transmission torque Tmax of the belt-type continuously variable transmission TM becomes the smaller of $Tmax_{DR}$ and $Tmax_{DN}/\eta i$, and when $T_{DR}$>Tmax, either one of the drive pulley 13 or the driven pulley 14 slips.

Figure 3:
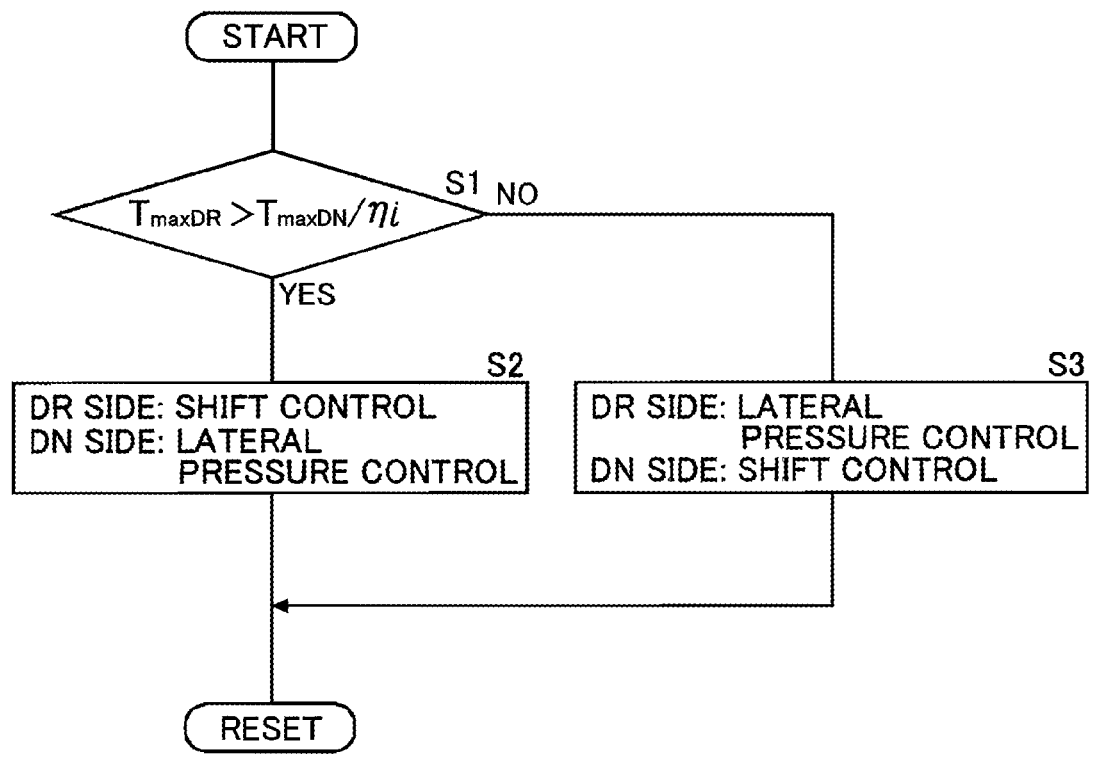
FIG. 3 is a flowchart for determining shift control and lateral pressure control of a pulley. (first embodiment)

As shown in the flowchart of FIG. 3, for example, if in step S1 $Tmax_{DR}$>$Tmax_{DN}/\eta i$, the driven pulley 14 slips at the instant that output torque $T_{DN}$>maximum transmission output torque $Tmax_{DN}$; therefore in step S2, the lateral pressure of the drive pulley 13 is controlled in order to control the gear ratio of the belt-type continuously variable transmission TM (shift control), and the lateral pressure of the driven pulley 14 is controlled in order to prevent the driven pulley 14 from slipping (lateral pressure control).

In contrast thereto, if in step S1 above $Tmax_{DR} \leq Tmax_{DN}/\eta i$, the drive pulley 13 slips at the instant that input torque $T_{DR}$>maximum transmission input torque $Tmax_{DR}$; therefore in step, the lateral pressure of the driven pulley 14 is changed S3 in order to control the gear ratio of the belt-type continuously variable transmission TM (shift control), and the lateral pressure of the drive pulley 13 is controlled in order to prevent the drive pulley 13 from slipping (lateral pressure control).

Figure 4:
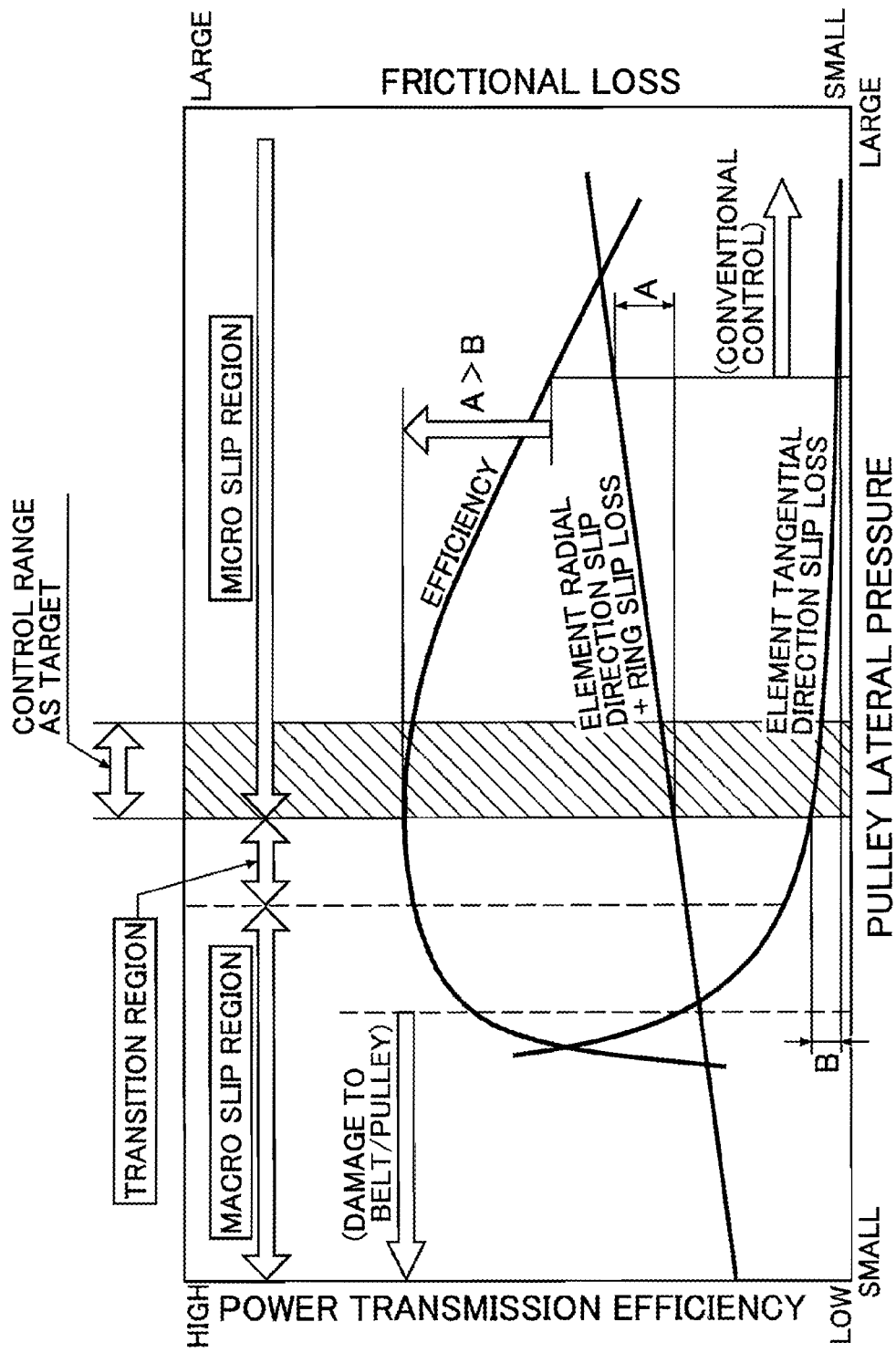
FIG. 4 is a graph showing the relationship between pulley lateral pressure and power transmission efficiency. (first embodiment)

As one means for enhancing the power transmission efficiency of the belt-type continuously variable transmission TM, decreasing the pulley lateral pressure applied to the pulley is known. FIG. 4 shows the relationships of power transmission efficiency and frictional loss with respect to the pulley lateral pressure; accompanying decrease in the pulley lateral pressure, a transition occurs from a micro slip region in which slip between the pulley and the endless belt is small, via a transition region, to a macro slip region in which slip between the pulley and the endless belt is large. In the micro slip region the power transmission efficiency gradually improves accompanying decrease in the pulley lateral pressure, but the power transmission efficiency starts to decrease in the transition region, and the power transmission efficiency decreases sharply in the macro slip region.

It is thought that the reason therefor is because the sum of frictional losses due to slip in the radial direction of a metal element of the endless belt and slip of a metal ring decreases with a constant relatively large rate of decrease A from the micro slip region to the macro slip region accompanying decrease in the pulley lateral pressure, but the frictional loss due to slip in the tangential direction of the metal element increases with a substantially constant relatively small rate of increase B (A>B) from the micro slip region to the transition region, and increases sharply in the macro slip region.

In order to obtain maximum power transmission efficiency, it is desirable for the pulley lateral pressure to be controlled so as to be in the micro slip region immediately before the transition region, but if the pulley lateral pressure is decreased excessively, it enters the macro slip region beyond the transition region from the micro slip region, and there is a possibility that the endless belt will slip against the pulley by a large amount, thus causing damage. Therefore, in order to enhance the power transmission efficiency while ensuring the durability of the belt-type continuously variable transmission TM, it is necessary to control the pulley lateral pressure so as to be in the micro slip region immediately before the transition region with good precision.

Because of this, in the present invention a parameter called torque ratio Tr is introduced. The torque ratio Tr is defined by $$Tr=T/Tmax \quad (1)$$

in which T is a torque currently transmitted by the belt-type continuously variable transmission TM (corresponding to the input torque $T_{DR}$ except in a case in which extreme slip is occurring) and Tmax is a maximum torque that can be transmitted without slipping with the current axial thrust (that is, pulley lateral pressure×pressure-receiving area of pulley piston) by the belt-type continuously variable transmission TM. Torque ratio Tr=0 corresponds to a state in which power transmission is not being carried out, torque ratio Tr=1 corresponds to a state in which the torque currently transmitted is saturated, and torque ratio Tr>1 corresponds to a state in which either macro slip has occurred or there is a transition thereto.

Figure 5:
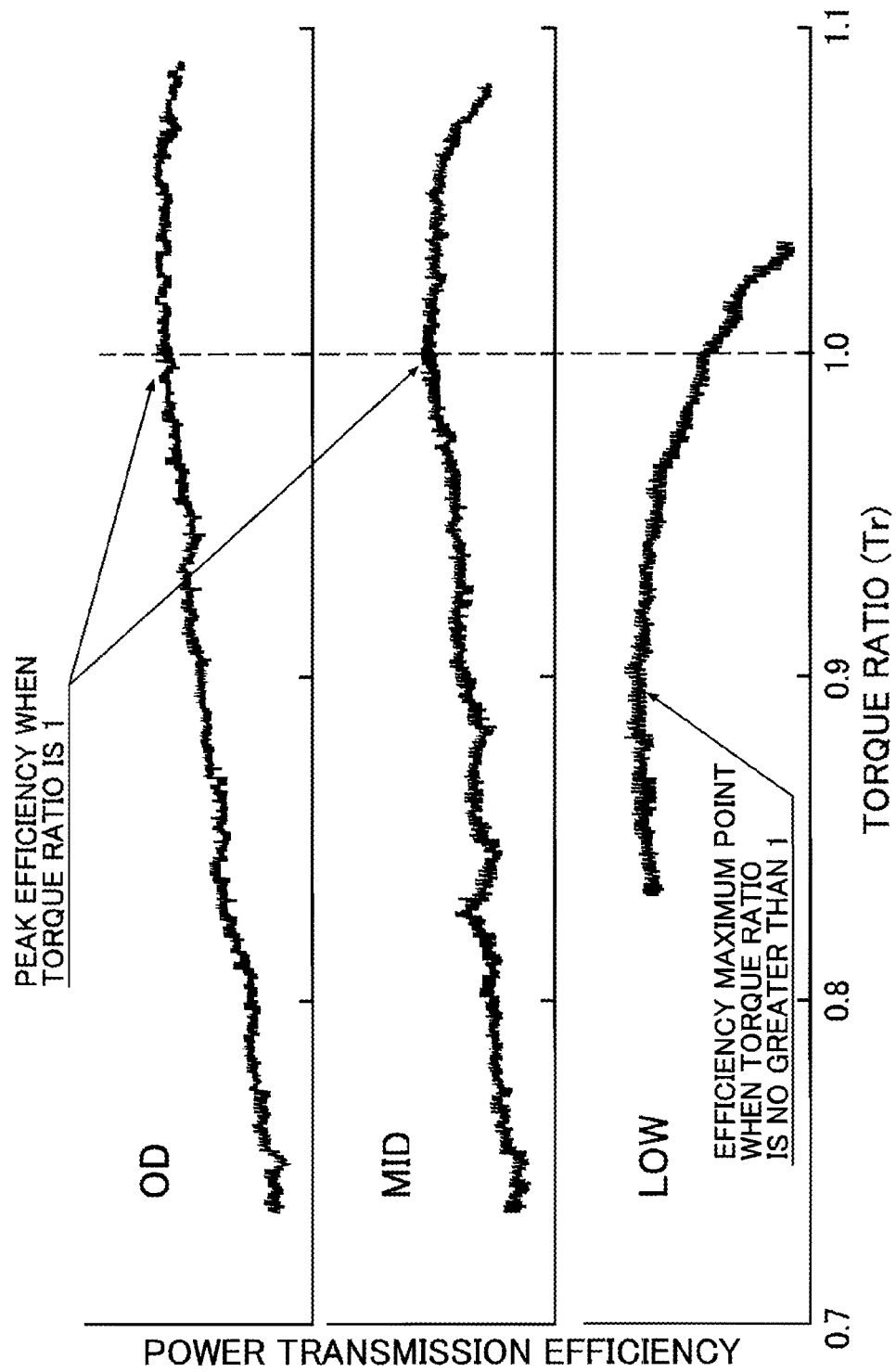
FIG. 5 is a graph showing the relationship between torque ratio and power transmission efficiency. (first embodiment)

As shown in FIG. 5, in a state in which the gear ratio is OD and in a state in which the gear ratio is MID, the maximum power transmission efficiency can be obtained when the torque ratio Tr is 1.0. Furthermore, it can be seen that in a state in which the gear ratio is LOW, the torque ratio Tr that gives the maximum power transmission efficiency decreases to 0.9, but high power transmission efficiency is still obtained even when the torque ratio Tr is 1.0. That is, the parameter torque ratio Tr has an extremely high correlation with power transmission efficiency; power transmission efficiency can be enhanced by controlling the pulley lateral pressure of the belt-type continuously variable transmission TM so that the torque ratio Tr attains a value close to 1.0 and, moreover, it is possible to prevent the occurrence of macro slip and ensure the durability of the belt-type continuously variable transmission TM.

The maximum transmittable torque Tmax required when calculating the torque ratio Tr is given by $$Tmax=2\mu RQ/\cos\alpha \quad (2)$$

when the drive pulley 13 is subjected to lateral pressure control, that is, when the drive pulley 13 slips, and by $$Tmax=2\mu RQ/\eta i \cos\alpha \quad (3)$$

when the driven pulley 14 is subjected to lateral pressure control, that is, when the driven pulley 14 slips. Here, $\mu$ is the coefficient of friction between the endless belt 15 and the pulley 13, 14 subjected to lateral pressure control, R is the winding radius of the endless belt 15 relative to the pulley 13, 14 subjected to lateral pressure control, Q is the axial thrust of the pulley 13, 14 subjected to lateral pressure control, a is the half angle of the V angle of the pulley 13, 14, $\eta$ is the power transmission efficiency of the belt-type continuously variable transmission TM, and i is the gear ratio.

In this way, since it is necessary to calculate the maximum transmittable torque Tmax in order to calculate the torque ratio Tr, and it is necessary to detect a coefficient of friction $\mu$ between the endless belt 15 and the pulley 13, 14, the winding radius R of the endless belt 15 relative to the pulley 13, 14, and the axial thrust Q of the pulley 13, 14 in order to calculate the maximum transmittable torque Tmax, a large number of sensors are necessary. Mounting these sensors on an actual vehicle is difficult to realize from the viewpoint of cost.

The present embodiment estimates the torque ratio Tr from a slip identifier IDslip and a frequency $f_0$ of rotational speed variation of the input shaft 11 (frequency $f_0$ of variable component) or a phase lag $\Delta\phi$ and the frequency $f_0$ of rotational speed variation of the input shaft 11 (frequency $f_0$ of variable component). Due to the rotational speed variation of the input shaft 11 being in synchronism with the rotational speed variation of the engine E, the frequency $f_0$ of the rotational speed variation of the input shaft 11 can be calculated from the engine rotational speed detected by the engine rotational speed sensor Sc, furthermore, as described later the slip identifier IDslip and the phase lag $\Delta\phi$ can be calculated from the variation of the input shaft rotational speed detected by the input shaft rotational speed sensor Sa and the variation of the output shaft rotational speed detected by the output shaft rotational speed sensor Sb, and the torque ratio Tr can therefore be estimated with good precision by means of a minimum number of sensors.

Figure 6:
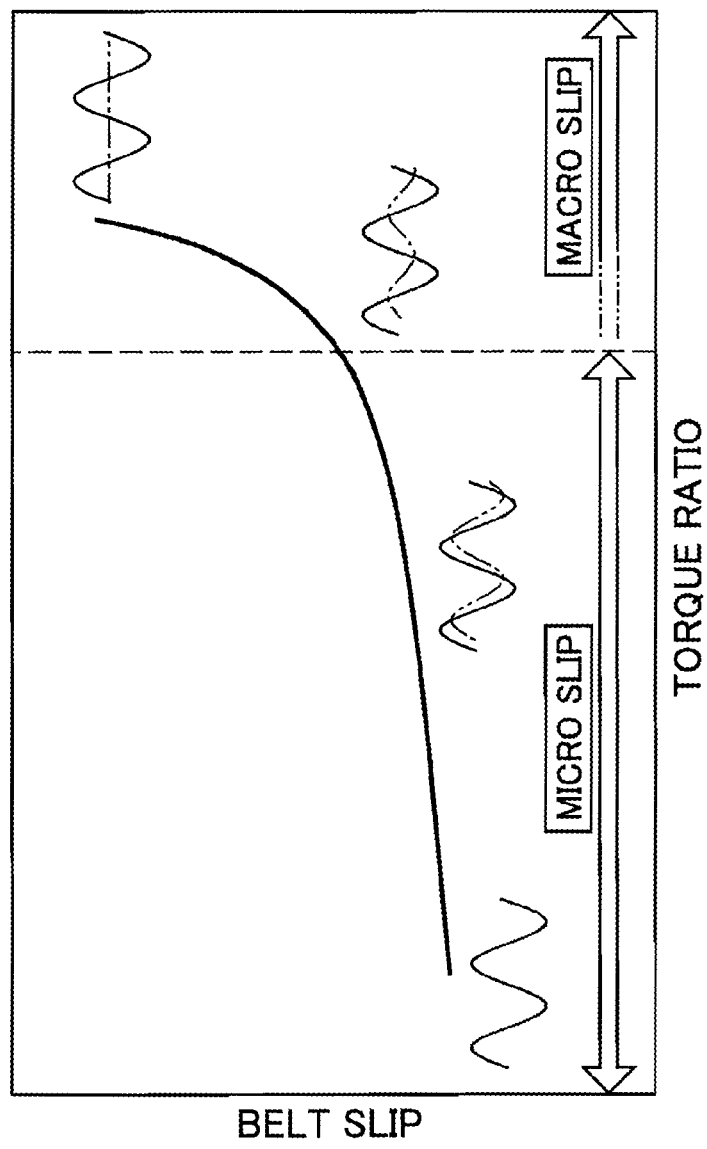
FIG. 6 is a diagram showing the relationship between torque ratio and belt slip. (first embodiment)

The slip identifier IDslip and the phase lag $\Delta\phi$ are now explained. As shown in FIG. 6, accompanying increase in the torque ratio Tr, in the micro slip region the amount of slip of the belt increases little by little, and when entering the macro slip region the amount of slip of the belt increases sharply. Since the rotational speed variation of the input shaft 11 is transmitted, via the endless belt 15, to the output shaft 12 connected to the input shaft 11 via the endless belt 15, a rotational speed variation having the same frequency is generated in the output shaft 12. When there is no slip between the belt and the pulley, the variation of the input shaft rotational speed is transmitted to the output shaft without decaying, but when the amount of slip increases accompanying increase in the torque ratio Tr, the amplitude of the variation waveform of the output shaft rotational speed becomes small relative to the amplitude of the variation waveform of the input shaft rotational speed, and the phase of the variation waveform of the output shaft rotational speed lags the phase of the variation waveform of the input shaft rotational speed.

Figure 7:
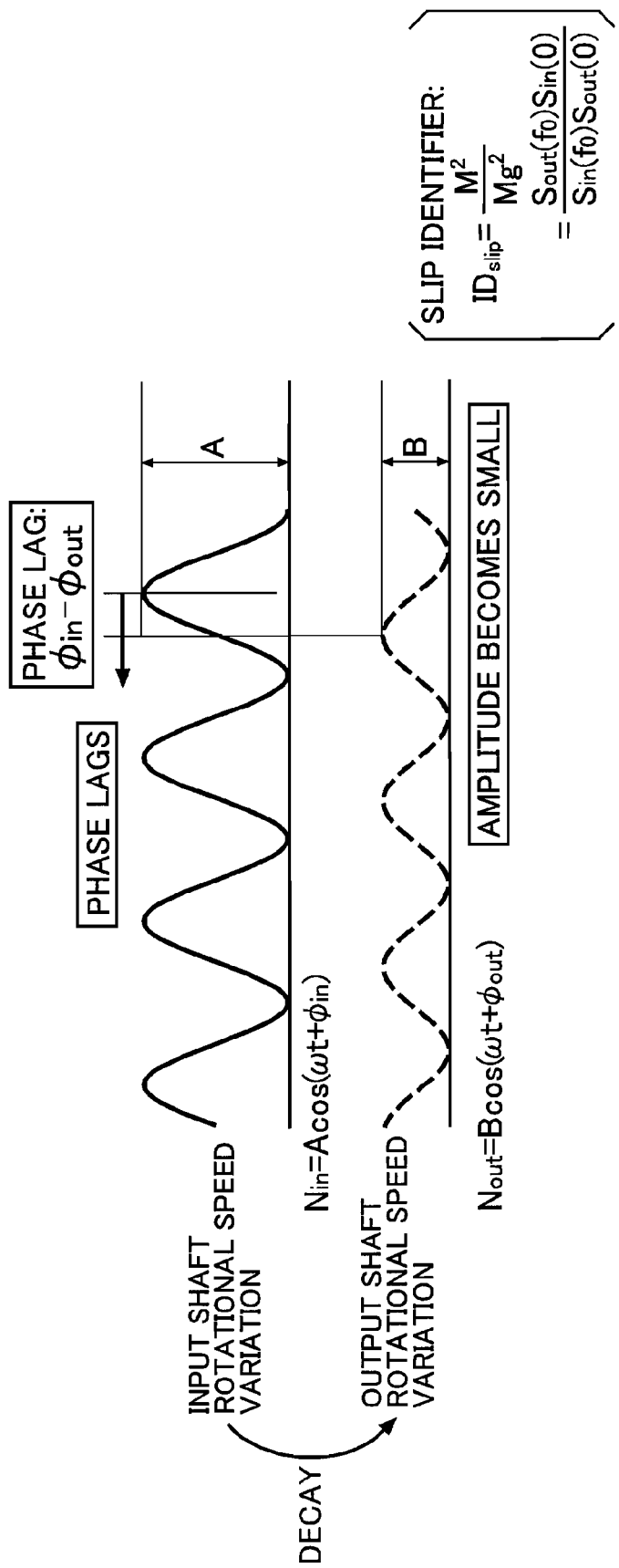
FIG. 7 is a diagram showing a variation waveform of input shaft rotational speed and a variation waveform of output shaft rotational speed. (first embodiment)

In FIG. 6 and FIG. 7 it can be seen that, relative to the variation waveform of the input shaft rotational speed denoted by the solid line, the amplitude of the variation waveform of the output shaft rotational speed denoted by the chain line gradually decreases accompanying increase in the torque ratio Tr, and the phase gradually lags. The oscillatory waveform of the input shaft rotational speed is given by $$Nin = A \cos(\omega t + \phi in) \quad (4),$$

and the oscillatory waveform of the output shaft rotational speed is given by $$Nout = B \cos(\omega t + \phi out) \quad (5).$$

That is, with regard to the oscillatory waveform of the output shaft rotational speed, relative to the oscillatory waveform of the input shaft rotational speed, the amplitude decreases from A to B, and the phase lags only by $\phi in - \phi out$.

A method for calculating the slip identifier IDslip is now explained.

First, the variation frequency $f_0$ of the rotational speed of the input shaft 11 is calculated from the equation below using a number of cylinders n of the engine E and a DC component Ne of the engine rotational speed. The DC component Ne of the engine rotational speed can be detected by the engine rotational speed sensor Sc, which is always included in a normal engine E.

[Eq. 1]

$$f_0 = \frac{nNe}{120} [\text{Hz}] \quad (6)$$

n: number of cylinders of engine
Ne: DC component of engine rotational speed [rpm]

The slip identifier IDslip is obtained by normalizing an amplitude ratio M between the input shaft 11 and the output shaft 12 at the variation frequency $f_0$ using an amplitude ratio Mg when there is no influence from a geometrical response, such as slip or excitation, of the belt-type continuously variable transmission TM, and is defined by the equation below.

[Eq. 2]

$$ID_{slip} = \left[\frac{M}{Mg}\right]^2 \quad (7)$$

M: amplitude ratio
Mg: amplitude ratio determined by geometrical conditions

The amplitude ratio M, which is a function of the variation frequency $f_0$ of the rotational speed of the input shaft 11, is defined by the equation below; the variation frequency $f_0$ can be calculated from the engine rotational speed outputted by the engine rotational speed sensor Sc, $S_{in}(f_0)$ is the power spectrum of the variation waveform of the input shaft rotational speed and can be calculated from the output of the input shaft rotational speed sensor Sa, and $S_{out}(f_0)$ is the power spectrum of the variation waveform of the output shaft rotational speed and can be calculated from the output of the output shaft rotational speed sensor Sb.

[Eq. 3]

$$M(f_0) = \sqrt{\frac{S_{out}(f_0)}{S_{in}(f_0)}} \quad (8)$$

$S_{in}$: power spectrum of input shaft variation
$S_{out}$: power spectrum of output shaft variation Furthermore, the amplitude ratio Mg under geometrical conditions is approximately given by the ratio of the DC component between the output signal and the input signal when slip occurring in the belt-type continuously variable transmission TM is small, and is defined by the equation below.

[Eq. 4]

$$Mg = \sqrt{\frac{S_{out}(0)}{S_{in}(0)}} \quad (9)$$

The amplitude ratio Mg under geometrical conditions depends on the physical quantity used as a variable component of the input shaft 11 and the output shaft 12. Since in the present embodiment rotational speed variation is used as the variable component, when the gear ratio of the belt-type continuously variable transmission TM is i, Mg=1/i. When torque variation is used as the variable component of the input shaft 11 and the output shaft 12, Mg=i. The gear ratio i of the belt-type continuously variable transmission TM can be calculated from the output of the input shaft rotational speed sensor Sa and the output of the output shaft rotational speed sensor Sb.

From the above, Equation (7) can be rewritten as the following equation, and the slip identifier IDslip can be calculated from the outputs of the input shaft rotational speed sensor Sa and the output shaft rotational speed sensor Sb, which already exist in the belt-type continuously variable transmission TM, and the output of the engine rotational speed sensor Sc, which already exists in the engine E.

[Eq. 5]

$$ID_{slip} = \frac{S_{out}(f_0)S_{in}(0)}{S_{in}(f_0)S_{out}(0)} \quad (10)$$

Furthermore, the phase lag $\Delta\phi$ is defined by the following equation; a phase $\phi$in of the variation waveform of the input shaft rotational speed can be calculated from the output of the input shaft rotational speed sensor Sa, and a phase $\phi$out of the variation waveform of the output shaft rotational speed can be calculated from the output of the output shaft rotational speed sensor Sb.

[Eq. 6]

$$\Delta\phi = \phi_{in}(f_0) - \phi_{out}(f_0) \quad (11)$$

Figure 8:
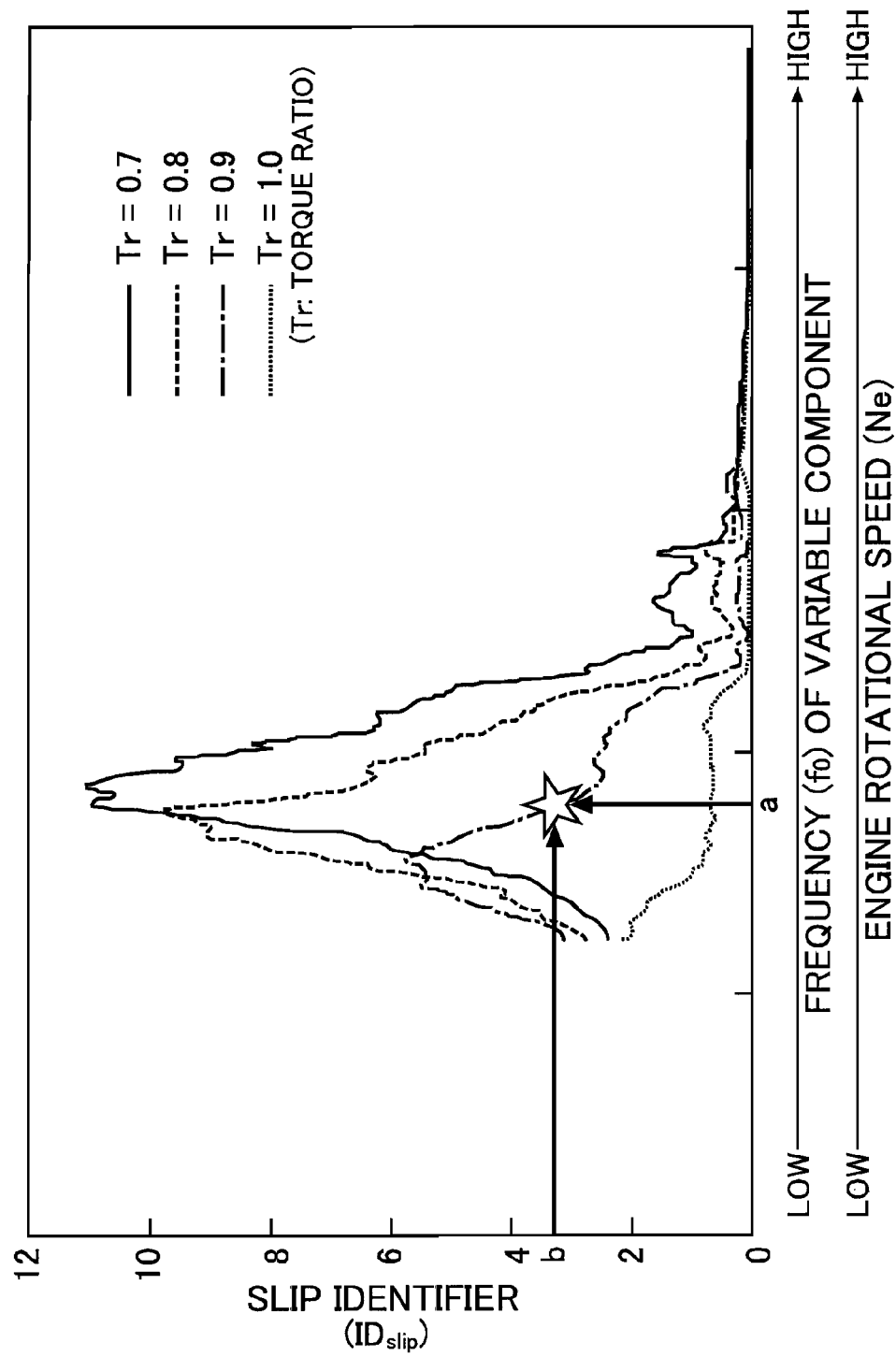
FIG. 8 is a diagram showing a map in which torque ratio is looked up from frequency and slip identifier as variable components. (first embodiment)

$\phi_{in}$: phase of input shaft variation
$\phi_{out}$: phase of output shaft variation FIG. 8 is a map in which the abscissa is the frequency $f_0$ of the variable component of the input shaft rotational speed (or engine rotational speed Ne) and the ordinate is the slip identifier IDslip; when the torque ratio Tr is changed in the manner 0.7, 0.8, 0.9, and 1.0, the characteristic line of the corresponding slip identifier IDslip changes. Due to the use of this map, when the slip identifier IDslip and the frequency $f_0$ of the variable component of the belt-type continuously variable transmission TM are determined for a given time, a torque ratio Tr for the given time can be estimated from these values. For example, when the value of the frequency $f_0$ of the variable component is a, and the value of the slip identifier IDslip is b, the torque ratio Tr is 0.9, which is the line denoted by the single-dotted broken line.

Figure 9:
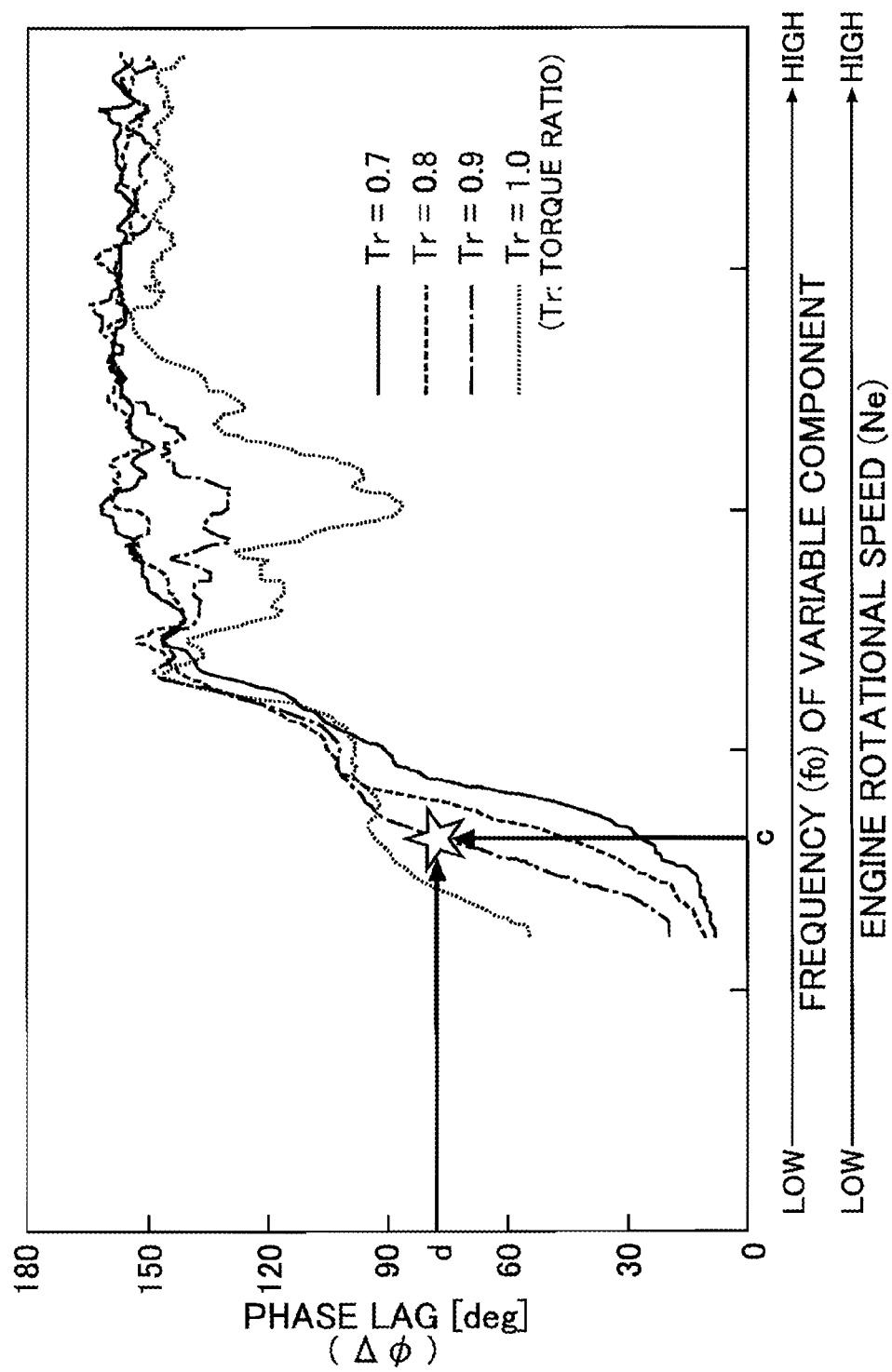
FIG. 9 is a diagram showing a map in which torque ratio is looked up from frequency and phase lag as variable components. (first embodiment)

FIG. 9 is a map in which the abscissa is the frequency $f_0$ of the variable component of the input shaft rotational speed (or engine rotational speed Ne) and the ordinate is the phase lag $\Delta\phi$; when the torque ratio Tr is changed in the manner 0.7, 0.8, 0.9, and 1.0, the characteristic line of the corresponding phase lag $\Delta\phi$ changes. Due to the use of this map, when the phase lag $\Delta\phi$ and the frequency $f_0$ of the variable component of the belt-type continuously variable transmission TM are determined for a given time, a torque ratio Tr for the given time can be estimated from these values. For example, when the value of the frequency $f_0$ of the variable component is c, and the value of the phase lag $\Delta\phi$ is d, the torque ratio Tr is 0.9, which is the line denoted by the single-dotted broken line.

Figure 10:
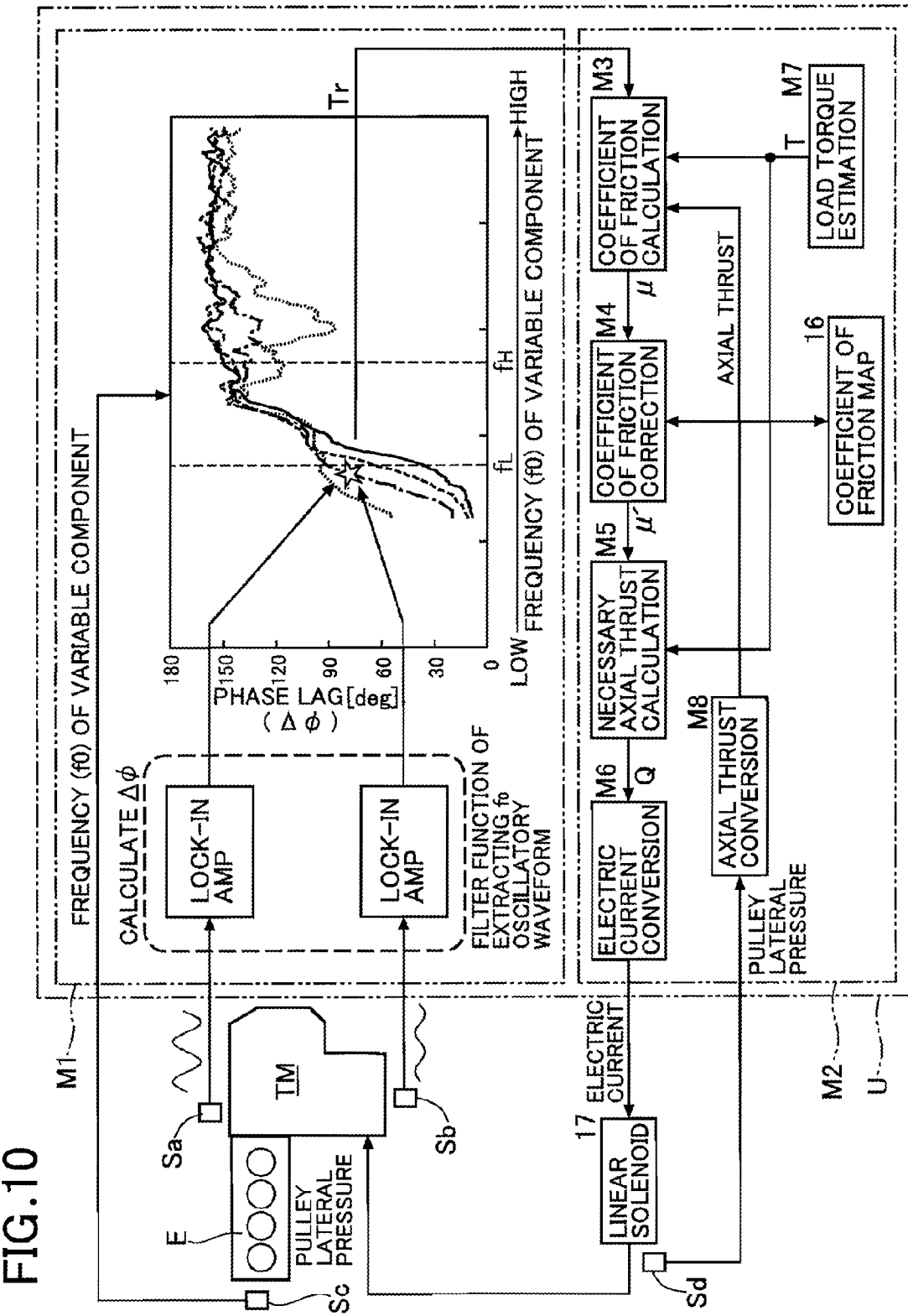
FIG. 10 is a block diagram of a control system for pulley lateral pressure. (first embodiment)

As shown in FIG. 10, the electronic control unit U includes torque ratio estimation means M1 and lateral pressure control means M2; the torque ratio estimation means M1 calculates the frequency $f_0$ of the variable component corresponding to the engine rotational speed detected by the engine rotational speed sensor Sc, makes the outputs from the input shaft rotational speed sensor Sa and the output shaft rotational speed sensor Sb pass through a lock-in amp having a filter function so as to extract the oscillatory waveform corresponding to the frequency $f_0$, and calculates the slip identifier IDslip and the phase lag $\Delta\phi$ from the oscillatory waveforms on the input side and the output side. Subsequently, the torque ratio Tr at a given time is estimated by carrying out a map lookup using the slip identifier IDslip or the phase lag $\Delta\phi$ (the phase lag $\Delta\phi$ in the example of FIG. 10) and the frequency $f_0$ of the variable component as parameters.

The lateral pressure control means M2 of the electronic control unit U controls the pulley lateral pressure of the drive pulley 13 or the driven pulley 14 based on the torque ratio Tr estimated by the torque ratio estimation means M1. The arrangement and function of the lateral pressure control means M2 of the electronic control unit U are now explained.

Furthermore, as shown in FIG. 10, the lateral pressure control means M2 includes coefficient of friction calculation means M3, coefficient of friction correction means M4, necessary axial thrust calculation means M5, electric current conversion means M6, load torque estimation means M7, and axial thrust conversion means M8.

The coefficient of friction calculation means M3 calculates the coefficient of friction $\mu$ between the endless belt 15 and the pulley 13, 14 subjected to lateral pressure control based on the torque ratio Tr estimated by the torque ratio estimation means M1, the load torque T estimated by the load torque estimation means M7 (corresponding to the load torque of the engine E or the torque currently transmitted by the belt-type continuously variable transmission TM), and the axial thrust, of the pulley 13, 14 subjected to lateral pressure control, converted by the axial thrust conversion means M8.

That is, the load torque estimation means M7 calculates the load torque T (corresponding to the torque currently transmitted by the belt-type continuously variable transmission TM) of the engine E from running conditions such as an intake negative pressure of the engine E, and the axial thrust conversion means M8 converts the oil pressure of the pulley 13, 14 subjected to lateral pressure control detected by an oil pressure sensor Sd (see FIG. 10) into the corresponding axial thrust Q. The coefficient of friction calculation means M3 calculates the coefficient of friction $\mu$ between the endless belt 15 and the pulley 13, 14 subjected to lateral pressure control by applying the load torque T estimated by the load torque estimation means M7 and the axial thrust Q converted by the axial thrust conversion means M8 to the following equations.

$$\mu = T\cos\alpha/2RQTr \quad (12)$$

$$\mu = T\eta i\cos\alpha/2RQTr \quad (13)$$

Equation (12) is used when the drive pulley 13 is subjected to lateral pressure control, and Equation (13) is used when the driven pulley 14 is subjected to lateral pressure control. In Equation (12) and Equation (13), $\alpha$ is the half angle of the V angle of the pulley 13, 14, R is the winding radius of the endless belt 15 relative to the pulley 13, 14 subjected to lateral pressure control, $\eta$ is the power transmission efficiency of the belt-type continuously variable transmission TM, and i is the speed ratio.

A coefficient of friction map 16 prestores a default value $\mu_0$ of the coefficient of friction between the pulley 13, 14 and the endless belt 15 for each gear ratio, and the coefficient of friction correction means M4 corrects the default value $\mu_0$ of the coefficient of friction stored in the coefficient of friction map 16 using the coefficient of friction $\mu$ calculated by the coefficient of friction calculation means M3 at a predetermined timing, and outputs the corrected coefficient of friction $\mu'$ to the necessary axial thrust calculation means M5. The reason why the coefficient of friction map 16 is present for each gear ratio is because the position where the endless belt 15 is wound relative to the pulley 13, 14 changes when the gear ratio changes, and when the winding radius increases it becomes easy for flange parts of the pulley 13, 14 to flex in a direction in which the flange parts move away from each other, and the winding radius becomes smaller than the proper value determined from the gear ratio.

Correction of the default value $\mu_0$ of the coefficient of friction by the coefficient of friction correction means M4 is an essential part of the present invention and is explained in detail later.

Subsequently, the necessary axial thrust calculation means M5 calculates, based on the corrected coefficient of friction $\mu'$ outputted by the coefficient of friction correction means M4, a necessary axial thrust Q for the pulley 13, 14 subjected to lateral pressure control, which is necessary to prevent the endless belt 15 from slipping.

There is a difference in the necessary axial thrust Q between a case in which the drive pulley 13 is subjected to lateral pressure control and a case in which the driven pulley 14 is subjected to lateral pressure control; when the drive pulley 13 is subjected to lateral pressure control, that is, when the drive pulley 13 slips, it is calculated from $$Q = T\cos\alpha/2\mu' RSTr \quad (14),$$

and when the driven pulley 14 is subjected to lateral pressure control, that is, the driven pulley 14 slips, it is calculated from $$Q = T\eta i\cos\alpha/2\mu' RSTr \quad (15).$$

Here, $\alpha$ is the half angle of the V angle of the pulley 13, 14, $\mu'$ is the corrected value of the coefficient of friction between contacting faces of the endless belt 15 and the pulley 13, 14 subjected to lateral pressure control, R is the winding radius of the endless belt 15 relative to the pulley 13, 14 subjected to lateral pressure control, T is the load torque, STr is the target torque ratio, $\eta$ is the power transmission efficiency of the belt-type continuously variable transmission TM, and i is the speed ratio. As explained for FIG. 5, since the power transmission efficiency of the belt-type continuously variable transmission TM becomes a maximum when the torque ratio Tr is no greater than 1.0 but close to 1.0, this value is set as the target torque ratio STr.

In this way, when the necessary axial thrust calculation means M5 calculates the necessary axial thrust Q for the pulley 13, 14 subjected to lateral pressure control, the electric current conversion means M6 converts the necessary axial thrust Q into an electric current of a linear solenoid 17 of a hydraulic circuit, and the linear solenoid 17 is actuated using this electric current to thus generate the necessary axial thrust Q in the pulley 13, 14 subjected to lateral pressure control, thereby carrying out lateral pressure control.

As hereinbefore described, when estimating the torque ratio Tr of the belt-type continuously variable transmission TM based on the transmission characteristics with which the variable component of the input shaft 11 is transmitted to the output shaft 12 via the endless belt 15, since at least one of the slip identifier IDslip, which is an indicator of the amplitude ratio of the variable component of the input shaft 11 and the output shaft 12, and the phase lag $\Delta\phi$, which is an indicator of the phase difference of the variable component of the input shaft 11 and the output shaft 12, is used, it is possible to estimate the torque ratio Tr, which is very closely related to the power transmission efficiency of the belt-type continuously variable transmission TM, with good precision, thus improving the power transmission efficiency. Moreover, since the torque ratio Tr is estimated from the slip identifier IDslip or the phase lag $\Delta\phi$, it is possible to minimize the number of sensors necessary for the estimation thereof, thus cutting the cost.

Furthermore, since estimation of the coefficient of friction $\mu$ between the endless belt 15 and the pulley 13, 14 subjected to lateral pressure control is carried out without being accompanied by the occurrence of macro slip, the necessary axial thrust Q of the pulley 13, 14 is determined based on the coefficient of friction $\mu$, and the lateral pressure of the pulley 13, 14 is controlled based on the necessary axial thrust Q, that is, since the lateral pressure is feedforward controlled using the coefficient of friction $\mu$, which is a parameter that directly controls the lateral pressure, it becomes possible to improve the control responsiveness and reduce the computational burden on a control device compared with indirect control in which the slip identifier IDslip or the phase lag $\Delta\phi$ itself is subjected to feedback.

Correction of the default value $\mu_0$ of the coefficient of friction by the coefficient of friction correction means M4 is now explained in detail. In the present embodiment, when the belt-type continuously variable transmission TM is at a predetermined gear ratio, the coefficient of friction calculation means M3 calculates the coefficient of friction $\mu$ between the pulley 13, 14 and the endless belt 15, and calculates a coefficient of friction correction factor $k=\mu/\mu_0$, which is the ratio relative to the default value $\mu_0$ of the coefficient of friction stored in the coefficient of friction map 16 corresponding to the gear ratio at that time. Multiplying the default values $\mu_0$ of the coefficient of friction for all the gear ratios by the same coefficient of friction correction factor $k=\mu/\mu_0$ allows the default value $\mu_0$ of the coefficient of friction to be corrected for all the gear ratios.

The reason why this is possible is because the change over time (change due to wear) of the coefficient of friction $\mu$ between the pulley 13, 14 and the endless belt 15 of the belt-type continuously variable transmission TM is the same regardless of the gear ratio, that is, regardless of the position of winding of the endless belt 15 with respect to the pulley 13, 14. If the change over time in the coefficient of friction $\mu$ is the same regardless of the gear ratio, even when the coefficient of friction $\mu$ is calculated for a predetermined gear ratio that generates a steady state frequently and consecutively and the default values $\mu_0$ of the coefficient of friction are corrected for all the gear ratios using only the same coefficient of friction $\mu$, the precision can be guaranteed. This enables the default value $\mu_0$ of the coefficient of friction to be appropriately corrected for a gear ratio for which it is difficult to calculate the coefficient of friction $\mu$ since the steady state hardly occurs, thereby making it possible to compensate for change over time of the coefficient of friction $\mu$ between the pulley 13, 14 and the endless belt 15.

The reason why change over time in the coefficient of friction $\mu$ between the pulley 13, 14 and the endless belt 15 is the same regardless of the gear ratio is now explained.

A frictional force F (N) acting between two objects is calculated as the product of a shear strength $\tau$ (N/m$^2$) of an oil film present between the two and a true contact area A (m$^2$) between the two.

$$F = \tau \times A \tag{16}$$

When the two objects are in contact with each other, since there are microscopic asperities on these contact faces, the two do not make contact through the entire area of the contact faces (apparent contact area A1), but make contact through a contact area (true contact area A) between tips of projecting parts. The shear strength $\tau$ is the shear strength of an oil film present between the tips of the projecting parts where the two objects make contact with each other.

From a different viewpoint, the frictional force F (N) acting between two objects is calculated as the product of the coefficient of friction $\mu$ between the two and a vertical load W (N), and the vertical load W is calculated as the product of an apparent plane pressure P (N/m$^2$) and the apparent contact area A1 (m$^2$).

$$F = \mu \times W = \mu \times (P \times A1) \tag{17}$$

From Equation (16) and Equation (17), $\mu$ can be determined from the following equation.

$$\mu = \tau \times A/(P \times A1) = \tau \times (A/A1)/P = \tau \times a \tag{18}$$

Here, $a$ (m$^2$/N) is a contact area increase factor and is obtained by dividing the contact area ratio (A/A1) by the apparent plane pressure P.

Figure 11:
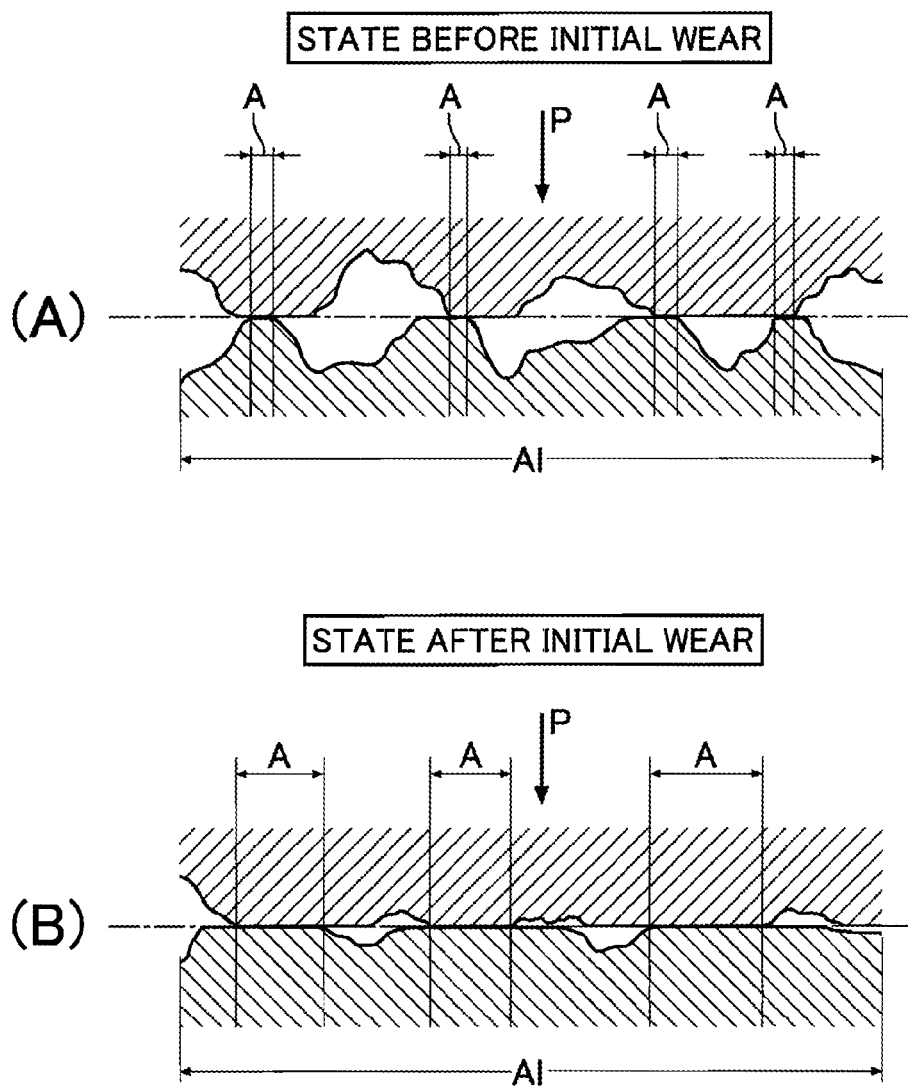
FIG. 11 is a schematic diagram showing the state of contact faces of two objects. (first embodiment)

As schematically shown in FIG. 11 (A), when two objects are pressed against each other, if the apparent plane pressure P is increased, the mutually contacting projecting parts of the two objects collapse, the true contact area A thereby increases, and the contact area ratio (A/A1), which is the ratio of the true contact area A relative to the apparent contact area A1, also increases. In general, when the apparent plane pressure P is increased, the contact area ratio (A/A1) increases in proportion thereto, and the contact area increase factor $a$, which is the value obtained by dividing the contact area ratio (A/A1) by the apparent plane pressure P, therefore becomes constant. In other words, as is clear from Equation (18), when the shear strength $\tau$ and the contact area increase factor $a$ are constant, the coefficient of friction $\mu$ is constant.

However, when the apparent plane pressure P is further increased, it is difficult for the mutually contacting projecting parts of the two objects to collapse further, it becomes difficult for the true contact area A to increase, the contact area ratio (A/A1) cannot increase in proportion to the increase of the apparent plane pressure P, the contact area increase factor $a$ therefore decreases, and the coefficient of friction $\mu$ decreases.

The coefficient of friction $\mu$ between the pulley 13, 14 and the endless belt 15 of the belt-type continuously variable transmission TM is also given by the product of the contact area increase factor $\underline{a}$ and the shear strength $\tau$ of oil present between the contact faces of the two. The way in which the coefficient of friction $\mu$ changes in response to the gear ratio of the belt-type continuously variable transmission TM is now discussed.

Although the shear strength $\tau$ changes depending on the characteristics of the oil, since the characteristics of the oil do not change in response to the gear ratio, it can be expected that the shear strength $\tau$ will not change in response to the gear ratio. Although the oil characteristics can change over time, the change has an equal influence at all the gear ratios and does not affect a specific gear ratio. Furthermore, the contact area increase factor $\underline{a}$ is determined by both the state of the contact face of the pulley 13, 14 and the state of the contact face of the endless belt 15; since the metal element of the endless belt 15 is in contact with the pulley 13, 14 at the same position even if the gear ratio changes, it can be expected that the state of the contact face of the endless belt 15 will not affect the contact area increase factor $\underline{a}$ according to the gear ratio. Although the state of the contact face of the endless belt 15 changes over time due to wear, etc., the change influences all the gear ratios equally, and does not influence a specific gear ratio.

On the other hand, the position of the contact face of the pulley 13, 14 relative to the endless belt 15 changes according to the gear ratio. That is, with regard to the drive pulley 13, when the gear ratio changes toward the LOW side, the winding position of the endless belt 15 shifts toward the radially inner side, and when the gear ratio changes toward the OD side, the winding position of the endless belt 15 shifts toward the radially outer side. On the other hand, with regard to the driven pulley 14, when the gear ratio changes toward the LOW side, the winding position of the endless belt 15 shifts toward the radially outer side, and when the gear ratio changes toward the OD side, the winding position of the endless belt 15 shifts toward the radially inner side. Therefore, if the contact area increase factor $\underline{a}$ of the pulley 13, 14 were to change differently for each gear ratio in response to the elapse of time, that is, if the contact area increase factor $\underline{a}$ of the pulley 13, 14 were to change so as to be different for each winding position, the contact area increase factor $\underline{a}$ would be different for each gear ratio, and as a result the coefficient of friction $\mu$ would be different for each gear ratio.

However, in reality, the contact area increase factor $\underline{a}$ can be considered to change equally over time for all the winding positions of the pulley 13, 14. This is because the contact area increase factor $\underline{a}$ is a value obtained by dividing, by the apparent plane pressure P, the contact area ratio (A/A1), which is obtained by dividing the true contact area by the apparent contact area; when the pulley 13, 14 and the endless belt 15 are brand new and the projecting parts on the surface are sharp (see FIG. 11 (A)), the projecting parts push each other and easily collapse when the apparent plane pressure P is increased, and the contact area increase factor $\underline{a}$ therefore attains a relatively high value (that is, the coefficient of friction $\mu$ becomes a relatively high value).

Since the tips of the projecting parts on the contact face of the brand new pulley 13, 14 are gradually worn accompanying the elapse of time, and the true contact area A gradually increases, it soon becomes difficult for the contact area ratio (A/A1) to increase further even if the apparent plane pressure P is increased, the contact area increase factor $\underline{a}$ gradually decreases, and the coefficient of friction $\mu$ gradually decreases. The tips of the projecting parts on the contact face of the brand new pulley 13, 14 wear due to contact with the endless belt 15, and after a relatively short period of running time has elapsed, the entire region of the section of the contact face of the pulley 13, 14 that is in contact with the endless belt 15 undergoes substantially uniform initial wear. When this initial wear is completed, a state as shown in FIG. 11 (B) is attained, an oil film is formed on the contact faces of the pulley 13, 14 and the endless belt 15, and a state is attained in which hardly any further wear occurs. In this state, the state of the contact face becomes substantially uniform for all the winding positions of the pulley 13, 14, and a situation in which the contact area increase factor $\underline{a}$ varies depending on the gear ratio does not occur.

That is, there is a possibility that the contact area increase factor $\underline{a}$ of the contact face of the pulley 13, 14 will change for each gear ratio (that is, for each position in the radial direction of the pulley 13, 14) during the progress of initial wear when there is a variation in the contact area increase factor $\underline{a}$, but after the initial wear is completed, it can be considered to be the same regardless of the gear ratio. This enables the coefficient of friction $\mu$, which is given by the product of the shear strength $\tau$ and the contact area increase factor $\underline{a}$, to be considered to be constant regardless of the gear ratio, and consideration need only be given to a change of the coefficient of friction $\mu$ in response to the change over time. Therefore, it is possible to ensure the precision of all the coefficient of friction maps 16 merely by calculating the coefficient of friction $\mu$ at a predetermined gear ratio and correcting the coefficient of friction maps 16 for all the gear ratios using the same coefficient of friction $\mu$.

Furthermore, since the coefficient of friction $\mu$ may be calculated for only one gear ratio, it becomes possible, by calculating the coefficient of friction $\mu$ at a gear ratio corresponding to a state in which steady running conditions of the belt-type continuously variable transmission TM are consecutively generated at high frequency, for example, the cruise state of a vehicle, to calculate the coefficient of friction $\mu$ at any time with good precision.

An embodiment of the present invention is explained above, but the present invention may be modified in a variety of ways as long as the modifications do not depart from the spirit and scope thereof.

For example, in the embodiment the default value $\mu_0$ of the coefficient of friction stored in the coefficient of friction map 16 is corrected and used for control of lateral pressure of the pulleys 13 and 14, but the application can be freely chosen.

The invention claimed is:

1. A coefficient of friction correction device for a belt-type continuously variable transmission, comprising
   a coefficient of friction map storing a default value ($\mu_0$) of a coefficient of friction between a pulley and an endless belt for each gear ratio,
   a coefficient of friction calculator for calculating the coefficient of friction ($\mu$) between the pulley and the endless belt, and
   a coefficient of friction corrector for correcting the default value ($\mu_0$) of the coefficient of friction stored in the coefficient of friction map based on the coefficient of friction ($\mu$) calculated by the coefficient of friction calculator, wherein
   the coefficient of friction corrector calculates a coefficient of friction correction factor from the coefficient of friction ($\mu$) calculated by the coefficient of friction calculator for a predetermined gear ratio and the default value ($\mu_0$) of the coefficient of friction stored in the coefficient of friction map for the predetermined gear ratio, and uniformly corrects the default value ($\mu_0$) of the coefficient of friction stored in the coefficient of friction map for each gear ratio using the coefficient of friction correction factor.

2. The coefficient of friction correction device for a belt-type continuously variable transmission according to claim 1, wherein the coefficient of friction correction factor calculated after an initial wear of the endless belt is completed is to be used.

* * * * *